(12) United States Patent
Beveridge

(10) Patent No.: US 6,393,105 B1
(45) Date of Patent: *May 21, 2002

(54) METHOD AND APPARATUS FOR MONITORING LOCAL TELEPHONY SERVICE POWER ON A HYBRID FIBER-COAX NETWORK

(75) Inventor: Gregory J. Beveridge, Thornton, CO (US)

(73) Assignees: MediaOne Group, Inc., Englewood; U S West, Inc., Denver, both of CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/468,391

(22) Filed: Dec. 20, 1999

Related U.S. Application Data

(63) Continuation of application No. 09/001,642, filed on Dec. 31, 1997, now Pat. No. 6,028,916.

(51) Int. Cl.[7] .............................. H04B 10/12; H02J 7/00; H02J 9/00
(52) U.S. Cl. .................... 379/56.2; 379/413; 307/66
(58) Field of Search .......................... 379/56.2, 413, 379/106.04, 176, 186, 171, 399–401, 169; 455/3.3, 4.2; 307/46, 48, 64, 66, 85–87, 80, 43, 150

(56) References Cited

U.S. PATENT DOCUMENTS

| | | | |
|---|---|---|---|
| 3,959,602 A | | 5/1976 | Jayson |
| 4,984,267 A | | 1/1991 | Martinez |
| 5,355,401 A | | 10/1994 | Skinner, Sr. |
| 5,442,472 A | * | 8/1995 | Skrobko ..................... 359/110 |
| 5,530,748 A | | 6/1996 | Ohmori |
| 5,661,463 A | * | 8/1997 | Letchak et al. ............. 340/636 |
| 5,664,002 A | | 9/1997 | Skinner, Sr. |
| 5,675,371 A | * | 10/1997 | Barringer ................ 455/423 X |
| 5,804,890 A | | 9/1998 | Kakalec et al. |
| 5,818,125 A | | 10/1998 | Manchester |

* cited by examiner

*Primary Examiner*—Tracy Legree
(74) *Attorney, Agent, or Firm*—Brooks & Kushman P.C.

(57) ABSTRACT

An apparatus. and method of powering a cable telephony service platform (CTSP) in a hybrid fiber coax (HFC) network are provided which utilizes a combination of power from a local AC driven power source having a back-up battery for powering the CTSP within a network interface unit (NIU) during interruptions in normal AC power, and a network generated charging current which maintains the battery at full float voltage charge irrespective of the duration of any such interruptions in AC power delivery. Thus, the present invention minimizes power required to be delivered by the network while still ensuring support of reliable lifeline telephony service for cable telephony on an HFC network.

4 Claims, 3 Drawing Sheets

METHOD AND APPARATUS FOR MONITORING LOCAL TELEPHONY SERVICE POWER ON A HYBRID FIBER-COAX NETWORK

This application is a continuation of application Ser. No. 09/001,642 filed on Dec. 31, 1997, now U.S. Pat. No. 6,028,916.

TECHNICAL FIELD

The present invention relates generally to telephony service on a hybrid fiber-coax (HFC) network, and more particularly to an improved power arrangement for ensuring reliable lifeline telephony service on an HFC network.

Background Art

There are primarily three types of physical media utilized in wired communication systems: (1) fiber optic cable, (2) coaxial cable, and (3) twisted copper pair cable ("twisted pair"). Presently, twisted pair cable predominates in the access local loop portion of existing telephone networks. Coaxial cable has been used widely by cable television companies, and both telephone companies and cable companies have made use of fiber optics for main or trunk line signal distribution.

Fiber optic cable can carry more information over greater distances than coaxial cable, while coaxial cable can carry more information over greater distances than twisted pairs. Because twisted pair is the predominant local loop technology in the telephone industry, new network architectures have been developed that work with twisted pair wire to increase information carrying capacity. In the cable industry, an HFC network employs a combination of broadband linear fiber optics and coaxial cable. Such a network also allows delivery of many advanced two-way services in a cost-effective manner when compared with total conversion to a baseband digital optical network with significant time-division multiplex hardware included in the access plant.

In addition to requiring two-way communication, voice telephony service has two other requirements not necessarily addressed by video distribution networks: lifeline service powering and privacy of voice communication. In video networks, the power to operate a subscriber television set for example, is provided by the subscriber, i.e., a subscriber merely plugs a television into an electrical outlet at the subscriber location. In the event of a power outage, the user is unable to view the delivered video services.

In contrast, telephony subscribers expect working telephone service whether or not electricity is available. Because basic telephone service is always expected to be available, the telephone distribution network typically provides to a subscriber location what is referred to as "talk battery" along with electric power utilized for conventional voice telephony signaling and supervision to ensure the availability of such "lifeline" services.

Basic HFC two-way capability requires the addition of reverse-path node laser transmitters and headend receivers, and activation of two-way amplifiers in the coaxial port on of the network. Node power and all locally powered amplifiers require appropriate uninterruptible power supplies (UPS) in order to bring basic HFC system reliability to the proper level for support of lifeline telephony service availability.

Conventional tap devices do not pass power to the drop cable. In some HFC networks, reverse-path filters are used to mitigate noise ingress in the reverse spectrum, and the maximum value of through current may only be 4 to 6 amperes at 48 volts AC. Such through current and relatively low voltage is inadequate to provide the necessary reserve power for cable telephony remote hardware in HFC networks being upgraded for lifeline telephony services.

Providing power for "talk battery" and emulation of conventional telephony signaling and supervision on HFC networks is usually accomplished in one of two ways, either as steady-state power supplied only from the network as shown in FIG. 1, or as Exclusive-OR local rectifier/battery arrangements at or near a customer residence as shown in FIG. 2.

More specifically, the hybrid fiber/coaxial (HFC) cable network of FIG. 1 includes a cable head-end/central office 10 incorporating a central office switch 12 connected to a two-way digital interface or head-end digital terminal (HDT) 14. HDT 14 modulates the digital signals from the line side of switch 12 to generate appropriate modulated RF carriers 16 for transmission on a fiber optic cable 18 by a combiner/optical transceiver 20, and to demodulate RF carriers received by optical transceiver 20 from cable 18.

Central office 10 further includes a bank of RF modulators 22 for generating modulated video/audio signals from baseband signals received from an external baseband video service 24. Optical transceiver 20 is arranged to transmit the modulated video signals onto cable 18. Baseband special services equipment 26 is also connected to the network via HDT 14 and transceiver 20.

An optical node 28 includes a suitable optical transceiver 30 coupled to fiber optic cable 18 and a coaxial cable 32 for providing a link for communications between the central office 10 and television units 34 and cable telephony service platform (CTSP) equipment 36 connected to telephone units 37 located at one or more customer premises 38. In the network power only arrangement, electrical power is generated by a protected power supply 40 located at a node, and powers amplifiers 42, and all equipment in a network interface unit (NIU) 44 located at or near a customer's premises via a power passing tap 46 and a drop cable 47. Power supply 40 also provides power for lifeline "talk battery" along with electric power utilized for conventional voice telephony signaling and supervision.

FIG. 2 illustrates the typical local power arrangement for an HFC network, wherein elements identical to those described in connection with FIG. 1 have been denoted with like reference numbers. As shown, a conventional tap 49, i.e., a nonpower passing tap, is employed in the network so that NIU 44 does not receive equipment power from node 28. Instead, electric power for talk battery and conventional voice telephony signaling and supervision is provided by an AC power converter/battery charger unit 48 connected to a conventional AC power source 50 and a back-up battery 52. In the event of power loss from AC power source 50, CTSP 36 within NIU 44 will receive power from battery 52.

Regarding the network-only power arrangement, safety regulations in certain countries limit voltage on a coaxial cable plant to a typical value of 48 vAC, and certain active and passive devices pass only about one-third of the current required to support cable telephony lifeline service applications. Thus, network power source arrangements have not proven satisfactory in certain situations.

With respect to the local power arrangement, reliability is dependent on considerations external to the network like AC power source reliability or user interaction to maintain properly charged batteries. In addition, a common practice in certain countries is to turn off all circuit breakers and unplug all appliances prior to departing on month-long holidays. Therefore, inadvertent or deliberate disconnection of ordinary lead-acid batteries servicing cable telephony network interface units (NIU) on customer premises are deprived of a constant float voltage for extended periods, which in turn leads to likely battery damage or destruction well before the rated operational life expectancy of the battery.

As such, a need exists for an apparatus and method of reliably enabling the electrical form of talk battery, signaling, and supervision in an HFC network which can support telephony lifeline service applications in a cost effective manner while also minimizing the need for customer interaction at the customer location, and power drawn from network optical node or other network uninterruptible power supplies.

SUMMARY OF THE INVENTION

Therefore, it is an object of the present invention to provide an apparatus and method for reliably enabling the electrical form of talk battery, signaling, and supervision in an HFC network which fully supports lifeline telephony service while overcoming the above-noted deficiencies of network-only power source and local-only power source arrangements.

It is another object of the present invention to provide an apparatus and method for powering CTSP equipment in an HFC network which allows upgrading of existing network systems to fully support lifeline telephony service in a cost effective manner.

It is yet another object of the present invention to provide an apparatus and method for powering CTSP equipment in an HFC network that fully supports lifeline service by locally powering the CTSP with a conventional AC power converter/charger and backup battery, while also providing capability for maintaining the battery at full float voltage value using a small trickle current from a network source during loss of local converter/charger output to the local back-up battery.

In accordance with these and other objects, the present invention provides an apparatus and method of powering a CTSP in a hybrid fiber coax network which combines power derived from a local AC power source having a back-up battery for powering the CTSP during interruptions in normal AC power, with a network generated charging current which maintains the battery at full float voltage value irrespective of the cause and duration of interruptions in power delivery from the AC power source to the back-up battery. The present invention minimizes power required from the network and maximizes the availability of cable telephony service when such devices are located at or in a residence. Compared with network-only power arrangements, overall current required from the network can be reduced by more than one order of magnitude, while also minimizing the risk of premature failure of the back-up battery and greatly improving the availability of reliable standby power for lifeline telephony over that of local-only powering arrangements having no network power input.

Thus, in accordance with one aspect of the present invention, an apparatus is provided for supplying electrical power to a network CTSP in an HFC network, wherein the network comprises at least one centralized communication node in two-way communication with one or more customer premises via a fiber optic transmission system connected to a coaxial cable transmission system via an electric/optical converter, and each telephone is connected to the coaxial cable via a network interface unit (NIU). The apparatus includes a converter/charger connected to the telephone and a conventional AC power source to provide electrical power to the CTSP during normal operation, a back-up battery connected to the CTSP for providing electrical power during interruptions in delivery of the converted AC power, and a battery trickle charger connected to the back-up battery and the coaxial cable transmission system of the network. The trickle charger receives electrical power from the network for maintaining the battery in a full float voltage charged state.

In accordance with another aspect of the present invention, a method is also provided for supplying electrical power to a CTSP in an HFC network, wherein the network comprises at least one centralized communication node in two-way communication with one or more customer premises via a fiber optic transmission system connected to a coaxial cable transmission system via an electric/optical converter, and each telephone is connected to the coaxial cable via a network interface unit (NIU). The method includes connecting a power source to the CTSP to provide talk battery and electrical power for telephony signaling and supervision during normal operation, operating from a back-up battery during interruptions in delivery of normal electrical power, receiving electrical trickle power from the network, and supplying the received network power to a battery trickle charger for charging the back-up battery to maintain a full float-voltage charged state during interruption of converter/charger output for any reason.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a flow chart illustrating the method of maintaining lifeline telephony service in an HFC network in accordance with the present invention.

BEST MODE FOR CARRYING OUT THE INVENTION

Figure 1:
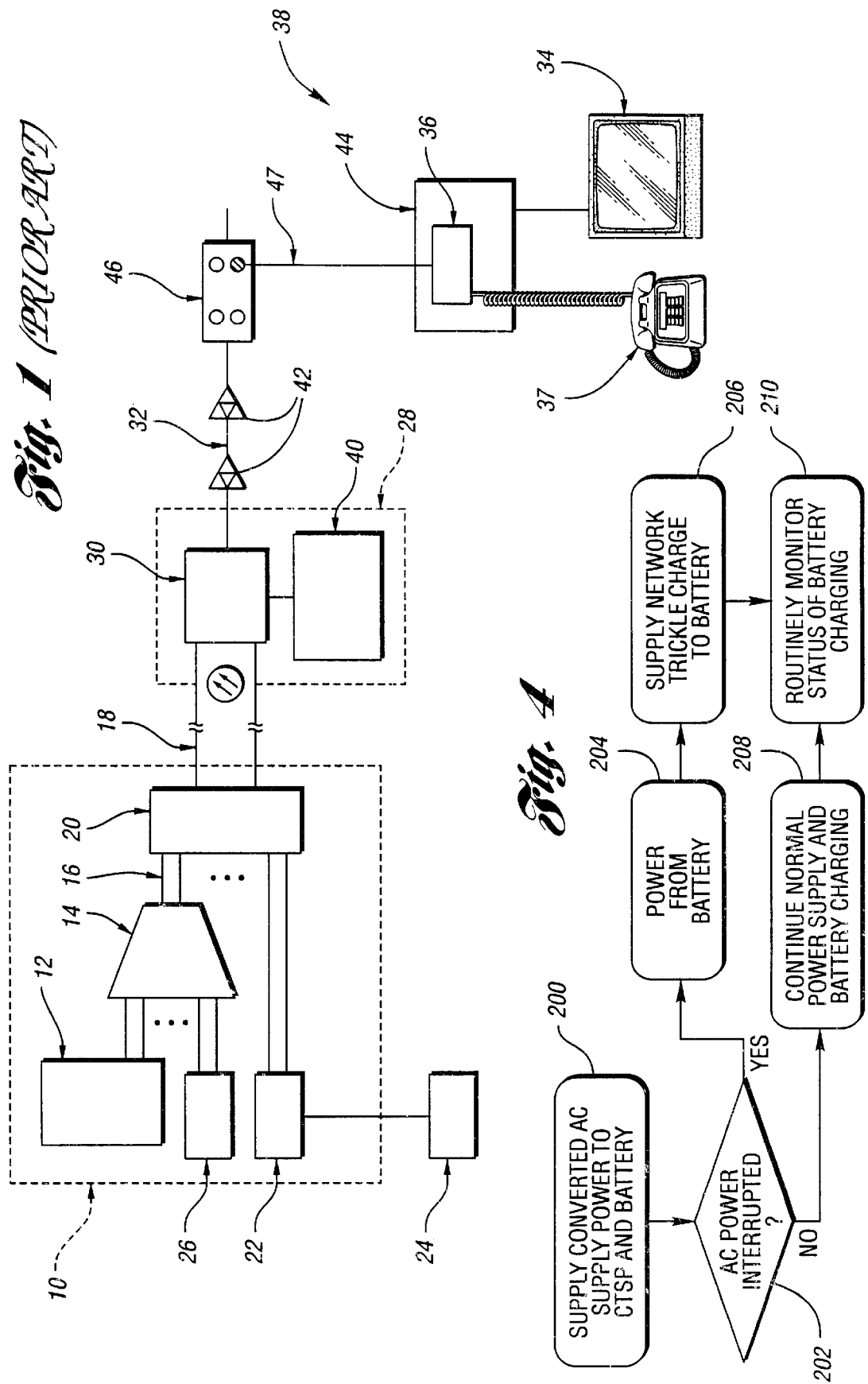
FIG. 1 is a block diagram of a conventional hybrid fiber-coaxial cable network architecture incorporating a network-only lifeline powering arrangement.
Figure 2:
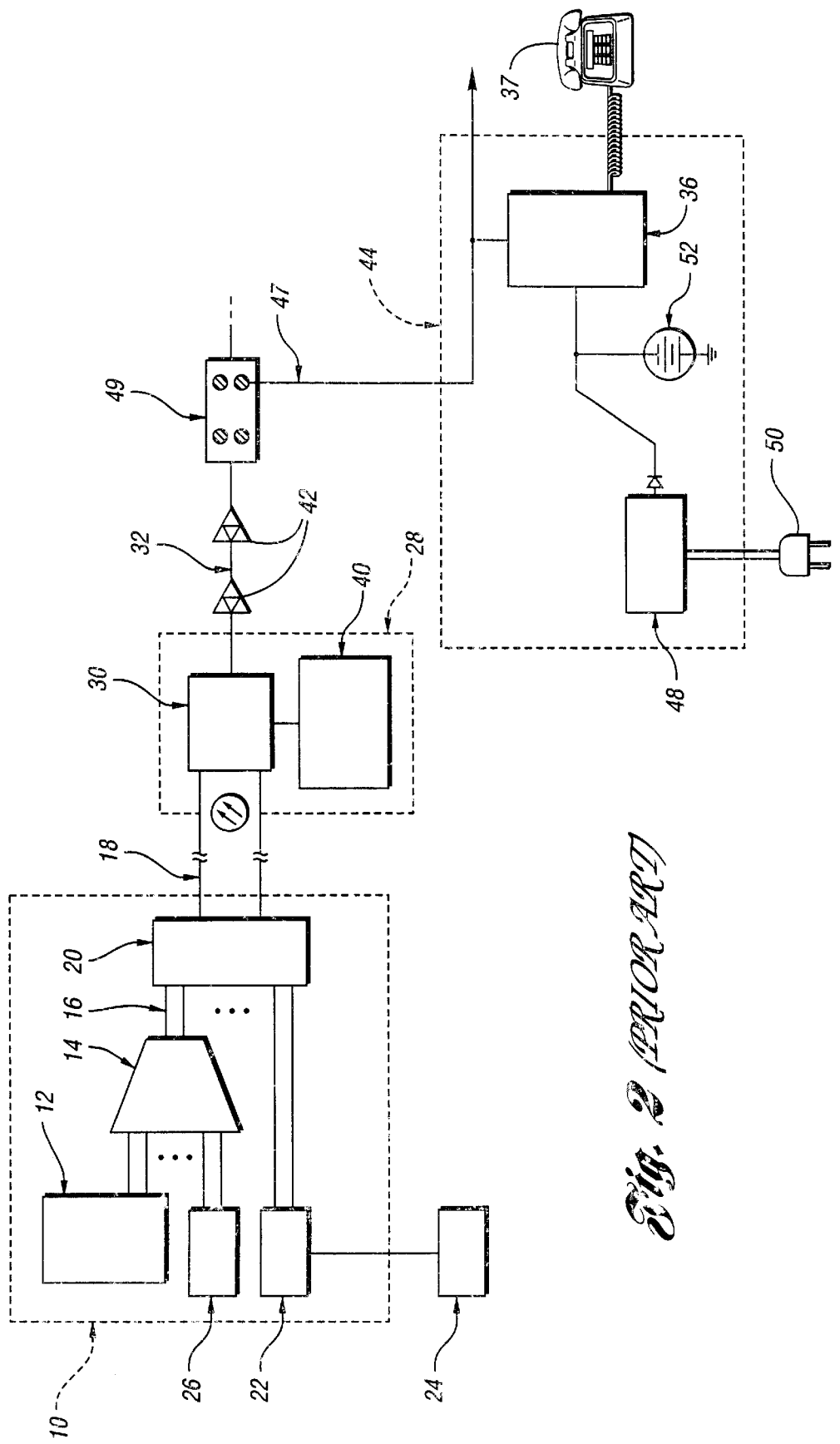
FIG. 2 is a block diagram of a conventional hybrid fiber-coaxial cable network architecture incorporating a local lifeline telephony powering arrangement.
Figure 3:
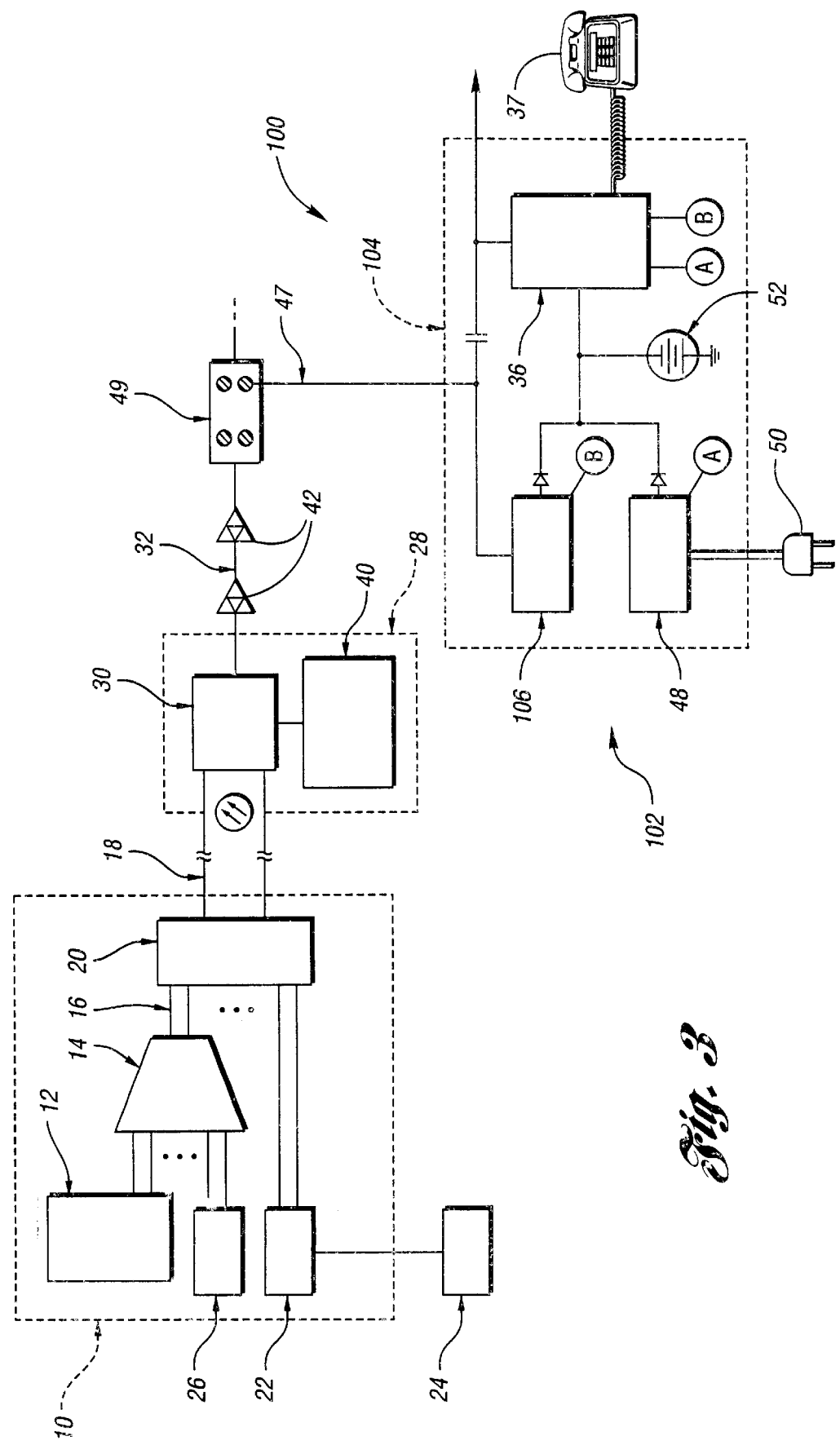
FIG. 3 is a block diagram of an HFC network power arrangement which supports lifeline service in accordance with the present invention.

Referring to FIG. 3, an exemplary embodiment 100 of a hybris fiber-coax network architecture is shown incorporating the. improved lifeline powering apparatus of the present invention network 100 shown connected to a customer up renuses or location 102. Network elements identical to those described in connection with FIGS. 1 and 2 have been denoted with like reference numbers. A network interface unit (NIU) 104 is coupled to coaxial cable 32 to provide two-way telephony and other high speed data type communications as well as video/audio signal distribution to the customer location.

In accordance with the present invention, electrical power for talk battery and conventional electrical voice telephony signaling and supervision is normally supplied to CTSP 36 by a conventional AC power converter/battery charger unit 48 connected to an AC power source 50. A back-up battery 52 is utilized in the event of power loss from AC power source 50.

In contrast with the typical local power arrangement of FIG. 2, a trickle charging circuit 106 is coupled to coaxial cable 32 for receiving a trickle charge from the network, e.g., node battery 40, and is arranged to supply the trickle charge current to battery 52 upon detecting a loss of the power output from converter/battery charger 48. The network trickle charge maintains the battery at an appropriate float voltage during extended periods of conventional AC power interruption, thereby automatically ensuring that the battery will not be prematurely destroyed due to loss or disconnection of conventional AC power.

In addition, the operation of the battery trickle charging circuit 106 and converter/battery charger 48-is monitored in the preferred embodiment at central office 10 via respective connections A and B between a NIU control processor within CTSP 36 and trickle charger 106 and converter/battery charger 48. A suitable logic circuit can be provided to indicate any or all of the following conditions: (1) converter/battery charger 48 failing to generate an output, (2) trickle charger 106 generating a trickle charge output, i.e., drawing network current, and (3) trickle charger 106 failing to generate a trickle charge output when condition (1) exists. With such a monitoring operation, the network operator can reliably determine when the battery charging arrangement requires servicing or replacement, thereby further ensuring that lifeline telephony service is adequately maintained.

Thus, the present invention obviates the need for expensive battery technologies to combat the problem of battery failure caused by lack of appropriate float voltage being supplied to the battery. The present invention also provides an arrangement which can be advantageously implemented into existing networks as an upgrade of lifeline telephony services at a significantly lower cost than that associated with providing a network-only power delivery arrangement.

Referring now to FIG. 4, a flow chart illustrates the method of the present invention. More specifically, at block 200 conventional AC electrical power is converted to a suitable DC voltage and supplied to the CTSP 36 and battery during normal operation thereof. If interruption of conventional AC electrical power is detected at block 202, power is automatically supplied to the CTSP 36 and the back-up battery at block 204. As denoted at block 206, a trickle charge current is selectively (and automatically) provided by the network for maintaining the proper float voltage for the effected back-up battery. Normal power continues to be supplied to the CTSP 36 and battery as denoted by block 208 if a loss of conventional AC power is not detected. The battery charging operation can be routinely monitored at the central office as indicated at block 210.

When connecting to an existing network as an upgrade, a customer option switch can be integrated with NIU to allow selective switching to a first "video only" position wherein network trickle charging power will not be made available to the customer drop and a reverse-path blocking filter (not shown) will be connected into the signal path, and a second "video and telephony" position wherein the reverse-path blocking filter would be disabled and network trickle power would be available during loss of conventional AC power as described above. A current limiting circuit can also be employed to prevent a short circuit condition on a particular tap from disabling service to other customers.

While the best mode for carrying out the invention has been described in detail, those familiar with the art to which this invention relates will recognize various alternative designs and embodiments for practicing the invention as defined by the following claims.

What is claimed is:

1. A network interface unit for coupling a telephone located at a customer premises with a hybrid fiber-coax network, the network comprising a central communication node in two-way communication with the customer premises, the network interface unit comprising:

a cable telephony service platform element for coupling with the telephone;

a converter/charger for providing electrical power to the cable telephony service platform element when AC power is available, and for charging a backup battery when AC power is available, wherein the cable telephony service platform element includes circuitry for providing an output indicating when the converter/charger fails to generate said electrical power, said output being monitored by a central office of the network; and a trickle charging circuit for providing a trickle charge from the hybrid fiber-coax network to the backup battery when the AC power is not available, and wherein said circuitry of the cable telephony service platform element further indicates when the trickle charger is generating said trickle charge and when said trickle charge fails to generate a trickle current when the converter/charger fails to generate said electrical power.

2. The network interface unit of claim 1, further comprising a switch connected to the network interface unit for selectively disconnecting the delivery of electrical power from the network to the customer premise when a telephone is not connected to the network.

3. In a hybrid fiber-coax network comprising a central communication node in two-way communication with a customer premises, a method for coupling a telephone located at the customer premises with the hybrid fiber-coax network, the method comprising:

coupling a cable telephony service platform element with the telephone;

providing electrical power to the cable telephony service platform element using a converter/charger when AC power is available;

charging a backup battery using the converter/charger when AC power is available;

providing an output indicating when the converter/charger fails to generate electrical power;

monitoring the output with a central office of the network;

providing a trickle charge from the hybrid fiber-coax network to the backup battery using a trickle charger when the AC power is not available; and indicating when the trickle charger is generating the trickle charge and when the trickle charge fails to generate a trickle current when the converter/charger fails to generate electrical power.

4. The method of claim 3, further comprising selectively disconnecting the delivery of electrical power from the network to the customer premise when a telephone is not connected to the network.

* * * * *